US006829816B2

(12) United States Patent
Nakagawa et al.

(10) Patent No.: US 6,829,816 B2
(45) Date of Patent: Dec. 14, 2004

(54) METHOD OF MANUFACTURING NONRECIPROCAL CIRCUIT DEVICE

(75) Inventors: Yasuhiro Nakagawa, Matto (JP); Takashi Hasegawa, Kanazawa (JP); Takashi Kawanami, Ishikawa-ken (JP); Yoshihiro Murai, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/056,258

(22) Filed: Jan. 24, 2002

(65) Prior Publication Data

US 2002/0097104 A1 Jul. 25, 2002

(30) Foreign Application Priority Data

Jan. 25, 2001 (JP) ....................................... 2001-017148
Nov. 15, 2001 (JP) ....................................... 2001-350133

(51) Int. Cl.$^7$ .............................. H01F 7/06; B23H 9/06

(52) U.S. Cl. .......................... 29/602.1; 29/607; 219/68; 219/121.68; 219/121.69; 219/121.72

(58) Field of Search ................................ 29/602.1, 607, 29/593, 840, 843; 219/68, 121.6, 121.61, 121.68, 121.69, 121.85; 338/90; 333/1.1

(56) References Cited

U.S. PATENT DOCUMENTS 4,707,722 A * 11/1987 Folk et al. .............. 257/699 X
5,495,210 A * 2/1996 Forterre et al. .............. 333/1.1
6,061,252 A 5/2000 Hosotani
6,449,123 B1 * 9/2002 Tsujimoto et al. .. 219/121.68 X

FOREIGN PATENT DOCUMENTS

EP 0 933 866 4/1999
JP 61-166050 * 7/1986 ................. 257/708
JP 6-13478 * 1/1994 ................. 257/708
JP 6-84629 * 3/1994 ................ 29/602.1

OTHER PUBLICATIONS

Fresonke, D., "In–Fab Identification of Silicon Wafers with Clean, Laser Marked Barcodes", Advanced Semiconductor Manufacturing Conference and Workshop, Nov. 1994, ASMC 94 Proceedings, IEEE/SEMI 14–16, pp. 157–160.*

Illyefalvi et al, "Application of Laser Engraving for the Fabrication of Fine Resolution Printed Wiring Laminates for MCM–Ls", Electronic Components and Technology Conference, May 1997, pp. 507–510.*

* cited by examiner

*Primary Examiner*—A. Dexter Tugbang
(74) *Attorney, Agent, or Firm*—Keating & Bennett, LLP

(57) ABSTRACT

A compact and highly reliable nonreciprocal circuit device can be manufactured at low cost. Marking is clearly performed on a surface of the nonreciprocal circuit device. In a method of manufacturing the nonreciprocal circuit device, after components constituting the device are joined together, solder is applied at portions where the components are bonded with each other. The magnetic force of a permanent magnet is adjusted and then laser marking is performed on a surface of a metal case. Next, the nonreciprocal circuit device is heated to perform together solder bonding, thermal aging of the permanent magnet, and the removal of stains left due to marking. Then, after checking the characteristics of the device, delivery inspection is conducted to complete the manufacturing process.

11 Claims, 11 Drawing Sheets

METHOD OF MANUFACTURING NONRECIPROCAL CIRCUIT DEVICE

BACKGROUND OF THE INVENTION

1. Field of the Invention

The present invention relates to nonreciprocal circuit devices such as isolators and circulators used in microwave bands and the like, methods for manufacturing the nonreciprocal circuit devices, and communication apparatuses incorporating the nonreciprocal circuit devices.

2. Description of the Related Art

Referring to FIG. 12 and FIGS. 13A to 13C, a description will be given to a method of marking a nonreciprocal circuit device according to the related art.

FIG. 12 is a flowchart showing the process of manufacturing the nonreciprocal circuit device. FIG. 13A shows a conceptual view of stamping, FIG. 13B shows the front view of a printing die, and FIG. 13C shows an enlarged view of a character printed with the printing die.

As shown in FIG. 12, in the fifth step of the process, the characteristics of the nonreciprocal circuit device are measured and in the sixth step, information including a product number and a lot number is printed on the nonreciprocal circuit device and sent to a step of conducting delivery inspection. The step of printing is performed by stamping, transfer printing, screen printing, ink-jet printing, or the like.

Here, printing by stamping will be described with reference to FIG. 13A.

After its characteristics have been determined, the nonreciprocal circuit device is placed in a predetermined position. Then, the product number, the lot number, and the like are printed in a predetermined position on the nonreciprocal circuit device by a printing die on which ink is applied in advance. The ink of printed characters is dried and hardened by heating. The completed product is then sent to the next step to perform delivery inspection.

However, in the nonreciprocal circuit device of the related art, there are several problems.

When ink is applied to the printing die, the viscosity of the ink changes with time and temperature in work environment. Thus, variations in printing occur even under the same printing condition. Additionally, when stamping is repeated for a long time, the printing die is worn out, also causing variations in printing.

Similarly, in transfer printing and screen printing, variations in printed characters are caused due to influence of the viscosity of ink and the abrasion of the screen. Also, these printing methods require an original form in advance. As the number of different types of products increases, the number of original forms also increases. As a result, more storage space is necessary for storing the original forms and the storage of the original forms becomes complicated.

In addition, when printing is performed by pressing, when compared with non-contact printing methods, the original forms of a printing die, a transfer plate, or the like are significantly worn out and thereby the life of the original forms is shortened. Consequently, the cost of auxiliary materials increases.

Additionally, due to the use of ink, the work environment becomes soiled, which leaves stains on the nonreciprocal circuit device.

When using a rubber plate as an original form, it is possible to form a character having a maximum line width of approximately 50 $\mu$m on the plate. However, since the rubber plate needs to be pressed against a printing surface of the device during the printing process, the printed character is crushed flat. Thus, the line width of the character becomes approximately 100 $\mu$m at minimum.

In this case, as shown in FIG. 13C, the printed character has a size of at least approximately 0.6×0.4 mm. Thus, characters smaller than that cannot be printed. Consequently, when the nonreciprocal circuit device is miniaturized, it is impossible to print the same information as that printed in the large size device and the number of characters needs to be reduced.

On the other hand, when the number of characters is reduced, the product information is also reduced and therefore the following problems occur.

When the number of lot characters is reduced, the number of products per lot increases. Then, in the following step or when defaults occur after the product is incorporated in a communication apparatus, workloads such as screening increases. When the number of product-name characters is reduced, failure in identifying the kinds of products frequently occurs. For example, other kinds of products may be mixed in mistakenly. This is particularly problematic with nonreciprocal circuit devices, since there are various kinds of products having the same configuration but using different frequency bands. Thus, without marked characters it is often difficult to identify the product by its appearance, such as its outer configuration.

In the ink-jet printing method, since there is no need for an original form and it is a non-contact method, production cost can be reduced. However, stains are often left due to splattered ink and the like.

In addition, since the ink-jet nozzle constantly becomes dirty, frequent cleaning-up and maintenance is needed.

Furthermore, even in the ink-jet printing method, since printing is performed by spattering ink, there is a problem about the resolution of printed characters. Thus, when a nonreciprocal circuit device is miniaturized, the ink-jet method has a limitation to the dimensions of characters as in the case of the stamping method.

SUMMARY OF THE INVENTION

Accordingly, one object of the present invention to provide a method of manufacturing a highly reliable nonreciprocal circuit device at low cost. In this method, even when the nonreciprocal circuit device is miniaturized, marking can be clearly performed thereon without reducing the amount of product (or other) information. It is another object of the invention to provide a nonreciprocal circuit device manufactured by the method of the invention. Furthermore, it is another object of the invention to provide a communication apparatus incorporating the nonreciprocal circuit device.

According to a first aspect of the present invention, there is provided a method of manufacturing a nonreciprocal circuit device including a metal case containing central conductors, a ferrite core arranged near the central conductors, and a permanent magnet for applying a static magnetic field to the ferrite core. The method includes a step of marking onto the metal case of the nonreciprocal circuit device by irradiating with a laser beam.

In addition, the method may further include a step of heating the entire nonreciprocal circuit device after the laser marking.

In addition, the method may further include a magnetic-force-adjusting step for magnetizing or demagnetizing a permanent magnet prior to the heating step.

In addition, in the heating step, both of the thermal demagnetization of the permanent magnet and the removal of stains generated due to the marking may be performed.

In addition, in this method, the heating temperature in the heating step may be set between 110° and 210° C.

In addition, the method may further include a step of applying solder paste to portions where the components comprising the nonreciprocal circuit device are bonded with each other, prior to the heating step.

In addition, when the method includes the above solder-applying step, the heating temperature in the heating step may be set between 210° and 310° C.

In addition, the metal case may include an upper yoke and a lower yoke and the laser marking may be performed onto the upper yoke before the upper and lower yokes are bonded with each other.

In addition, in the method, the laser marking may be performed by continuously irradiating with a laser beam.

In addition, in the method, the laser marking may be performed by irradiating with a pulsed laser beam.

In addition, the laser beam may have a wavelength of 10 $\mu$m or less.

Furthermore, the used laser beam may be a YAG laser or a $YVO_4$ laser.

According to a second aspect of the present invention, there is provided a nonreciprocal circuit device including central conductors, a ferrite core arranged near the central conductors, a permanent magnet for applying a static magnetic field to the ferrite core, and a metal case containing the central conductors, the ferrite core, and the permanent magnet. In the nonreciprocal circuit device, a coating layer including a silver layer is formed on a surface of the metal case or on surfaces of the upper and lower yokes to perform marking onto the coating layer by irradiating with a laser beam.

This nonreciprocal circuit device may further include a layer formed of nickel or copper arranged under the silver layer.

In addition, in the nonreciprocal circuit device of the invention, the entire thickness of the coating layer may be 3 $\mu$m or more.

Furthermore, the nonreciprocal circuit device may further include a nickel layer formed on the silver layer.

According to a third aspect of the invention, there is provided a communication apparatus including the nonreciprocal circuit device according to the invention.

BRIEF DESCRIPTION OF THE DRAWINGS

Other features and advantages of the present invention will become apparent from the following description of the invention which refers to the accompanying drawings.

DETAILED DESCRIPTION OF EMBODIMENTS OF THE INVENTION

Referring to FIG. 1 through FIG. 7C, a description will be given of a nonreciprocal circuit device according to a first embodiment of the present invention and a method of manufacturing the nonreciprocal circuit device.

Figure 2:
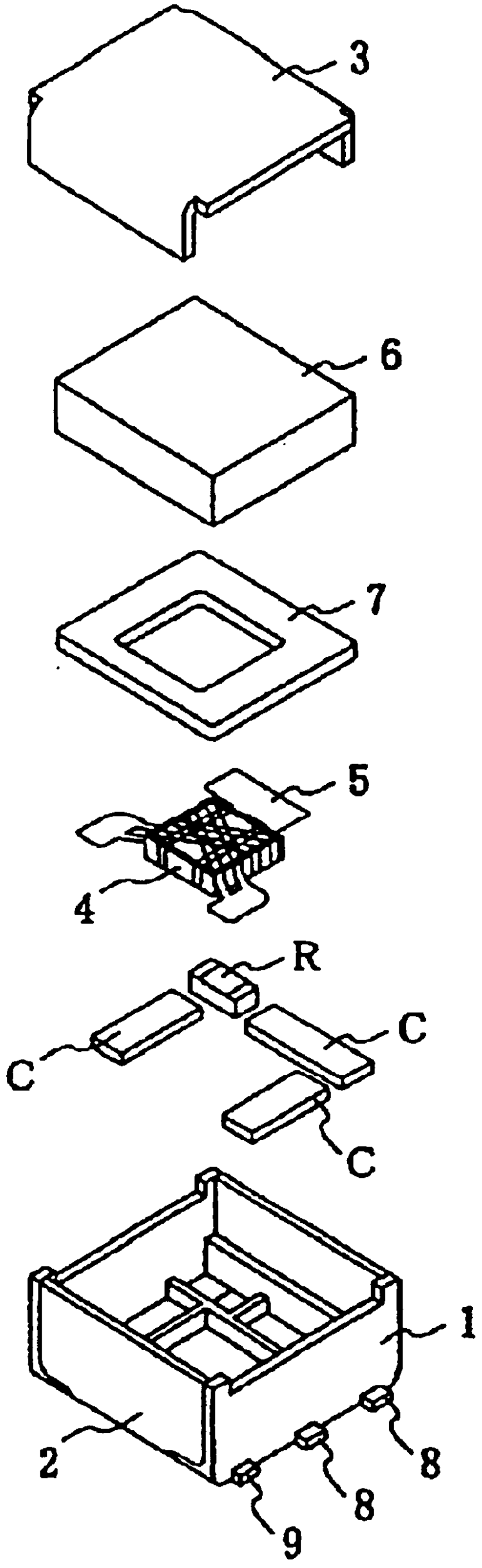
FIG. 2 shows an exploded perspective view of the nonreciprocal circuit device.

As best shown in FIG. 2, the nonreciprocal circuit device includes a metal lower yoke 2 and a metal upper yoke 3 which are coupled to a resin case 1 to define the outer case of the nonreciprocal circuit device as a part of the metal case. A ferrite member 4, central conductors 5, a permanent magnet 6, a spacer 7, ground terminals 8, an input/output terminal 9, a resistor R, and capacitors C are all housed in the outer case.

A base layer is preferably formed on a surface of each of the upper and lower yokes 2 and 3 by plating with nickel (Ni) or copper (Cu) and then a further layer is preferably formed by plating with silver (Ag) on the base layer.

With the above arrangement, since a skin current flows through the silver-plated layer of each yoke, conductive loss due to a ground current can be effectively prevented. Also, due to the presence of the nickel-plated or copper-plated base layer, the adhesion of the plated silver layer is improved compared with the case in which silver is directly plated on iron as a base material. Thus, the reliability of the device is enhanced. In this situation, the skin current flows only through the depth between 0.5 and 5 $\mu$m from the surface of a metal case. Accordingly, when the thickness of the silver-plated layer is set between approximately 1 and 10 $\mu$m, conductive loss due to the ground current can effectively be prevented. The thickness of the nickel-plated or copper-plated layer increases the adhesion.

The thickness thereof is preferably between approximately 0.1 and 2 $\mu$m.

Figure 1:
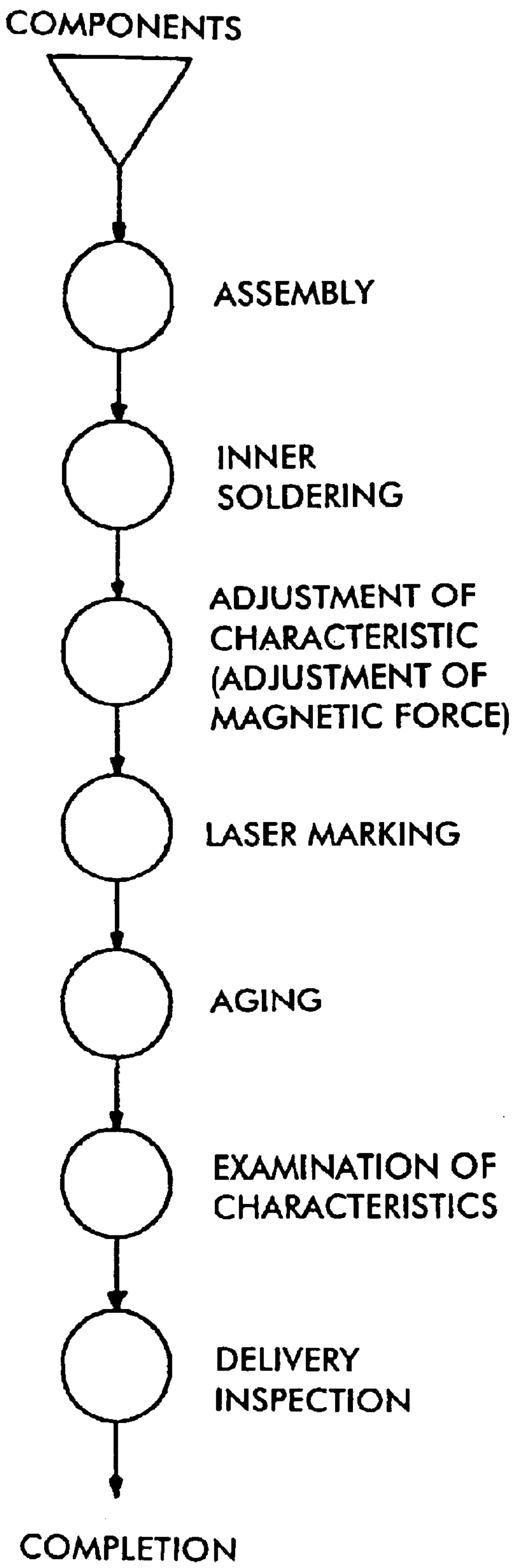
FIG. 1 shows a flowchart for manufacturing a nonreciprocal circuit device according to a first embodiment of the present invention.

Next, the process of manufacturing the nonreciprocal circuit device will be described according to the steps shown in FIG. 1.

[Assembly]

First, the inner components are assembled together. As shown in FIG. 2, the resin case 1 and the lower yoke 2 are integrally formed and the ground terminals 8 and the input/output terminals 9 are provided therewith. Inside the resin case 1, the ferrite 4 having the central conductors 5 forming a predetermined angle therebetween and the permanent magnet 6 for applying a static magnetic field to the ferrite 4 are arranged via the spacer 7. The capacitors C as matching elements and the resistor R as a terminating resistor are connected to the central conductors 5 and arranged inside the resin case 1. In this situation, the upper yoke 3 is bonded with the lower yoke 2 in a covering (overlapping) manner to form the entire nonreciprocal circuit device.

[Inner Soldering]

Next, the central conductors 5, the capacitors C, the resistor R, the ground terminals 8, and the input/output terminals 9 are solder-bonded with each other.

[Adjustment of Magnetic Force]

Next, the permanent magnet 6 (hereinafter referred to simply as the magnet) is magnetized or demagnetized to perform a magnetic-force adjustment (adjustment of characteristic) so that desired characteristics can be obtained finally.

[Laser Marking]

Figure 3A:
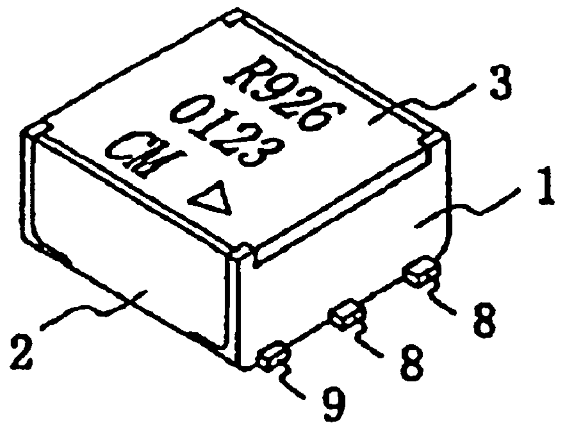
FIGS. 3A to 3C show an external perspective view of the nonreciprocal circuit device, a top view thereof, and an enlarged view of a character marked on the nonreciprocal circuit device.
Figure 3B:
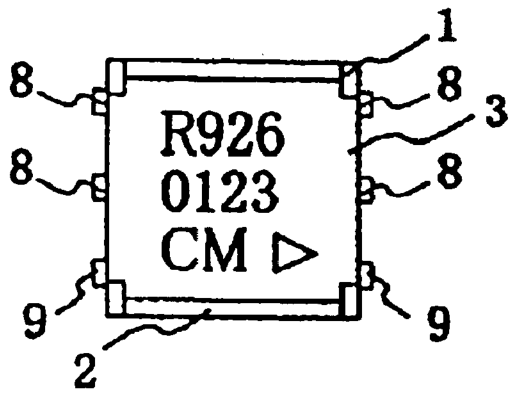
Figure 3C:
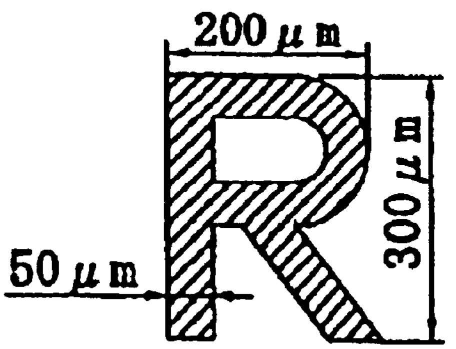

After the nonreciprocal circuit device has been assembled, a surface of the upper yoke 3 is marked by continuously irradiating it with a laser beam to print product information such as a lot number as shown in FIGS. 3A to 3C.

FIG. 3A is an external perspective view of the nonreciprocal circuit device after laser marking. FIG. 3B is a top view of the nonreciprocal circuit device and FIG. 3C is an enlarged view of a marked character.

The diameter of the laser beam is set between 10 and 40 μm. Irradiation with the laser beam forms grooves having line-widths from 30 to 50 μm. The grooves are preferably used to print alphanumeric characters. As a result, as shown in FIGS. 3A to 3C, marking characters, which have dimensions as small as 300×200 μm, can be printed.

Accordingly, even when the nonreciprocal circuit device is miniaturized, product information and the like can be printed on the nonreciprocal circuit device without reducing the number of characters.

Figure 4A:
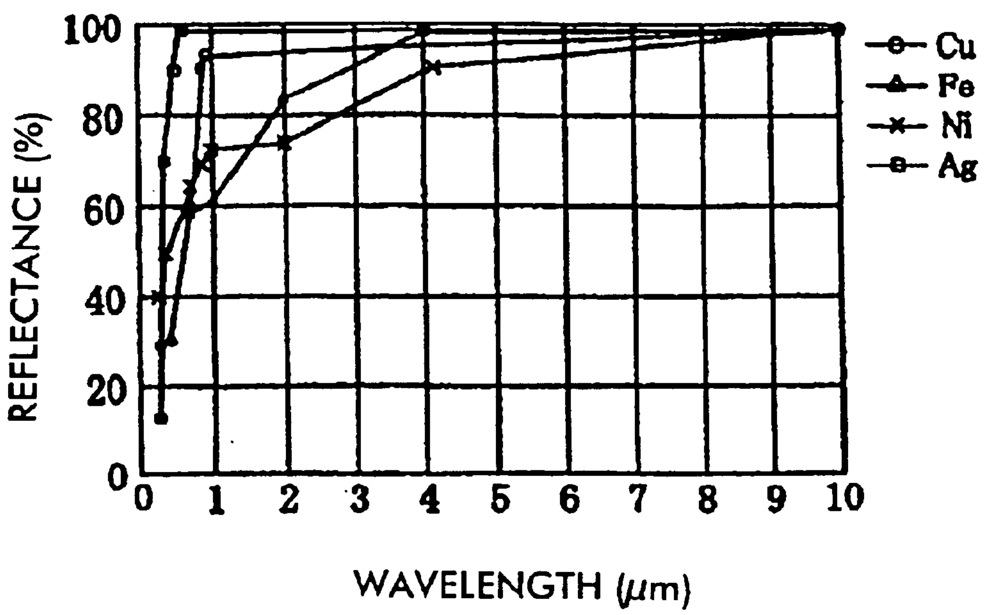
FIGS. 4A and 4B each show the relationship between the wavelength of a laser beam and reflectance on a metal surface.
Figure 4B:
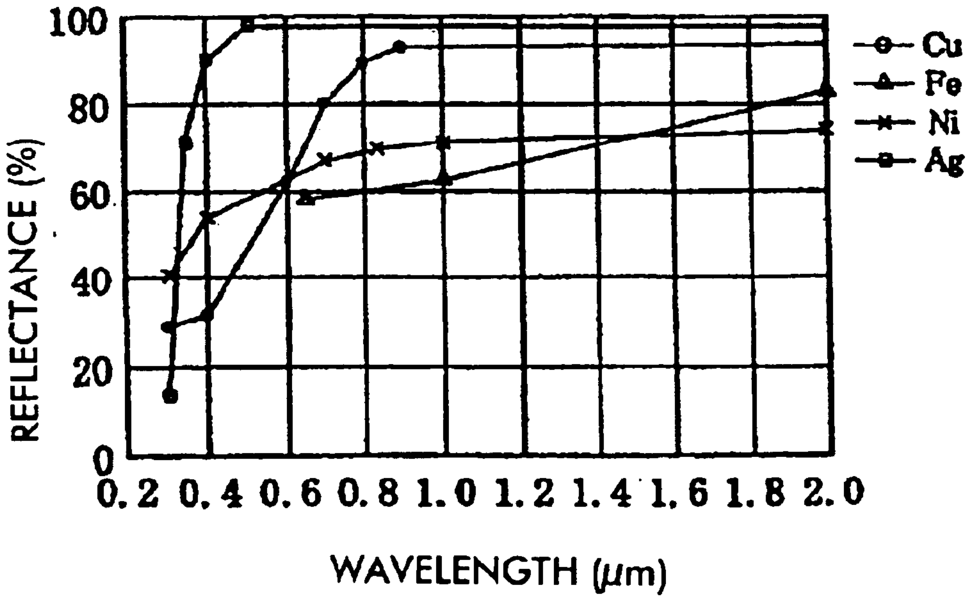

On the other hand, there is a problem in that a laser beam is reflected on a metal surface. Each of FIGS. 4A and 4B shows the relationship between the wavelength of a laser beam and reflectance on a metal surface.

As shown in each of the graphs, when the wavelength of the laser beam is over 10 μm, the reflectance on the metal surface increases, while energy absorbed in the metal surface decreases significantly, thereby reducing the marking efficiency. For this reason, the wavelength of the laser beam is preferably 10 μm or less.

A $CO_2$ laser has a wavelength of 10.6 μm and its marking efficiency is poor. For this reason, it is preferable to use a YAG laser or a $YVO_4$ laser, each of which have a wavelength of 1.06 μm and therefore laser marking can be efficiently performed. Furthermore, the YAG laser and the $YVO_4$ laser can emit beams having wavelengths of 0.532 μm (second harmonic), 0.355 μm (third harmonic) and 0.266 μm (fourth harmonic), respectively. Accordingly, more efficient marking can be performed.

Thus, laser-marking efficiency can be enhanced and a laser's output can be controlled so that the laser marking can be performed with a small amount of electrical power.

When laser marking is performed onto a silver-plated surface, the depths of grooves have a margin error of approximately ±1 μm. When performing laser marking on the silver-plated surface, with a reference depth of 2 μm at minimum, a groove made by the marking may be so deep that an iron base member is exposed and becomes rusty. This reduces the reliability of the device.

Figure 5A:
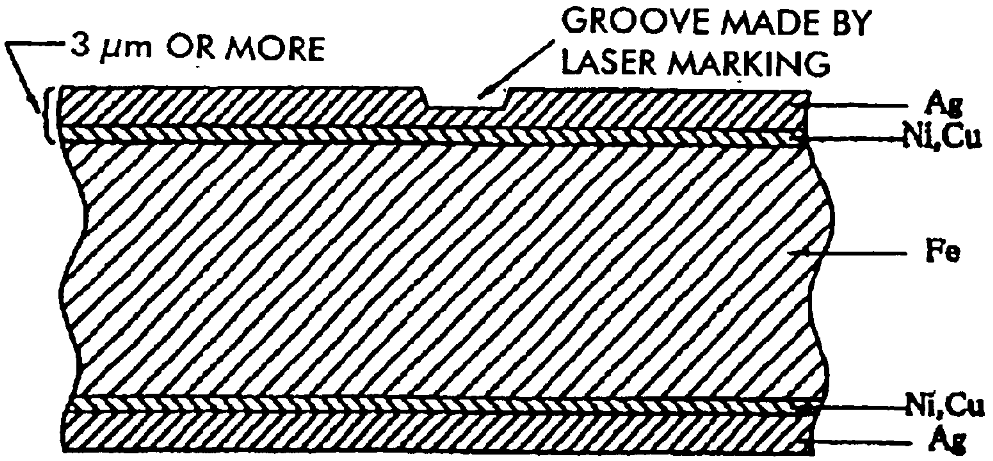
FIGS. 5A and 5B each show a partial section of the metal case included in the nonreciprocal circuit device.
Figure 5B:
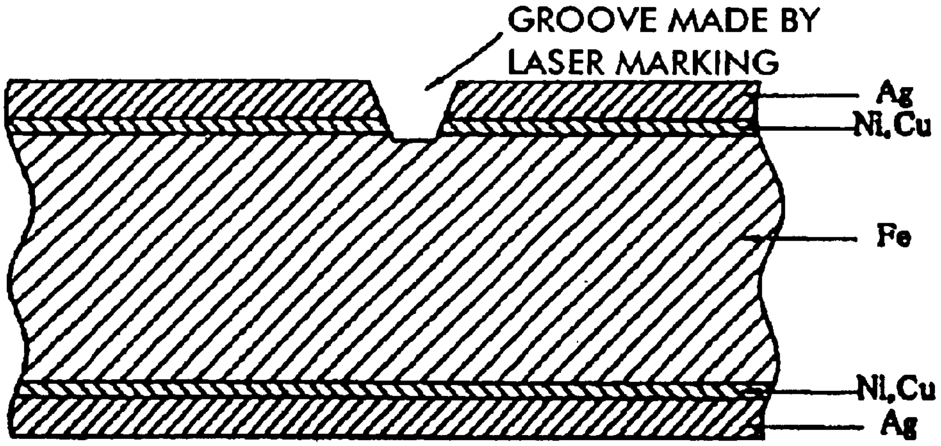

FIGS. 5A and 5B show the depths of grooves formed by laser marking. FIG. 5A is a partial section of the upper yoke, in which the depth of laser marking is within the silver-plated layer. FIG. 5B is a partial section of the upper yoke, in which the depth of laser marking reaches the base iron member.

Thus, with a reference groove-depth of 2 μm, in order to prevent the base member from being exposed outside, a plated layer having a thickness of 3 μm or more is required.

Figure 6:
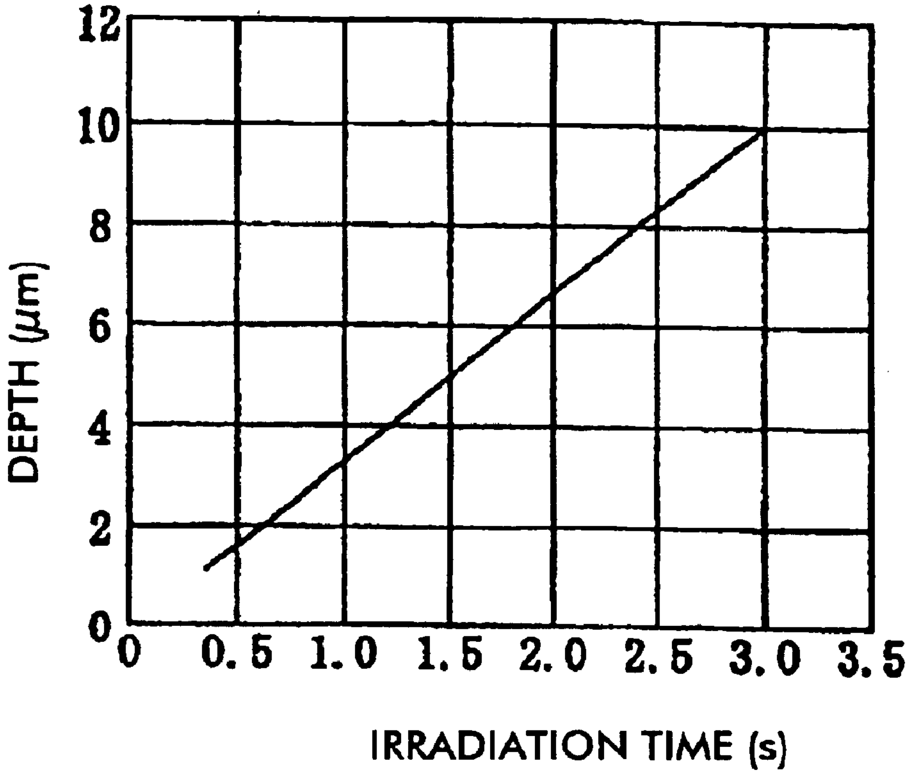
FIG. 6 shows the relationship between laser-beam irradiation time and the depth of a groove.

FIG. 6 shows the relationship between the depth of a groove and a time during which irradiation by a YAG laser having the wavelength of 1.06 μm is applied on a silver-plated surface at an output of 3 W.

The depths shown in the graph are average values obtained experimentally. The values include a variation of approximately 1 μm. Thus, in order to form a groove of 2±1 μm, irradiation time needs to be approximately 0.6 seconds. Since this can be achieved in the present equipment, marking can be steadily performed. As a result, a highly reliable nonreciprocal circuit device can be obtained.

[Aging (Heating)]

Next, the nonreciprocal circuit device, after laser marking, will be heated for aging.

Figure 7A:
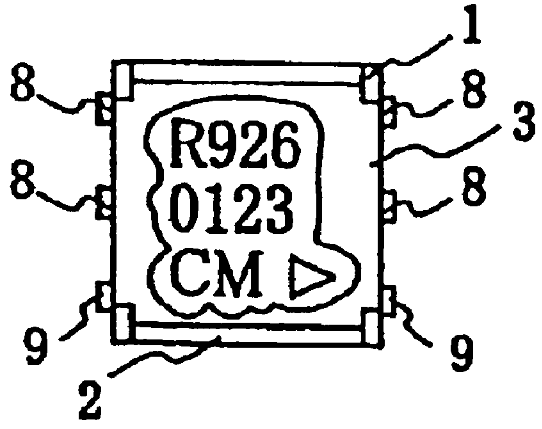
FIGS. 7A to 7C each show a top view of the nonreciprocal circuit device after laser marking.
Figure 7B:
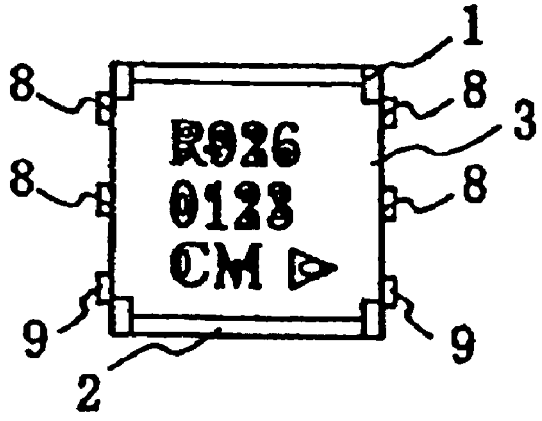
Figure 7C:
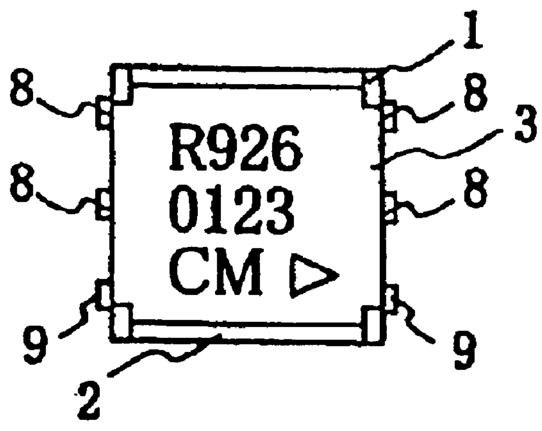

FIG. 7A is a top view of the nonreciprocal circuit device immediately after laser marking. FIG. 7B is a top view of the nonreciprocal circuit device cleaned by a physical method, and FIG. 7C is a top view of the nonreciprocal circuit device heated after laser marking.

As shown in FIG. 7A, when laser marking is performed onto a silver-plated upper yoke 3, black stains are generated on the surface around the marking area. Thus, it is often difficult to identify (read) the characters. The stains can be removed with a metal brush, a resin brush, or the like. However, as shown in FIG. 7B, the stains cannot be completely removed by these methods. On the other hand, as shown in FIG. 7C, the black stains can be removed by performing thermal aging (heating) after marking.

However, in the nonreciprocal circuit device, due to thermal hysteresis, the magnetic force changes, and thereby thermal demagnetization, occurs in which the characteristics change from the initial state. When the thermal demagnetization occurs in a communication apparatus incorporating the nonreciprocal circuit device, the characteristics of the communication apparatus are deteriorated. However, in a temperature range in which thermal demagnetization has previously occurred, thermal demagnetization does not recur. Thus, in the process of manufacturing the nonreciprocal circuit device, desired characteristics of the device can be maintained by adjusting in advance the magnetic force of the magnet so that the desired characteristics can be obtained after thermal aging and then by performing thermal aging to make thermal hysteresis over its use environment.

In this case, since thermal aging is performed both to cause thermal demagnetization and to remove the black stains generated due to laser marking, one of the manufacturing steps can be reduced. Accordingly, since it is possible to share the equipment and reduce the step lead time, a low-priced and highly reliable nonreciprocal circuit device can be obtained.

In the preferred embodiment, a main cause generating the black stains is silver oxide. Heating at 160° C. or higher enables the complete removal of the stains. Experimentally, at 110° C. or higher, a satisfactory removal effect can be obtained.

The solder used inside the nonreciprocal circuit device is preferably a high-temperature solder whose melting point lies between 220° and 240° C. Thus, in the case in which heating for solder-bonding is performed prior to the thermal aging step, the solder melts again in the thermal aging step and thereby the solder-bonded parts are separated from each other if the thermal aging step is performed at a temperature higher than the melting point of the solder. Even if no such a separation occurs, tin contained in the solder is diffused inside the bonding metal and therefore a fragile alloy layer is formed, with the result that the strength of the bonded parts are reduced. This decreases reliability. As a consequence, since the thermal aging temperature needs to be 210° C. or lower, the temperature for thermal aging is preferably set between 110 and 210° C.

[Characteristic Examination]

The electrical characteristics of the completed nonreciprocal circuit device will be examined to screen good and bad products.

[Delivery Inspection]

The final delivery inspection will be performed.

Next, referring to FIG. 8, a description will be given of a method of manufacturing a nonreciprocal circuit device according to a second embodiment of the present invention.

The structure of the nonreciprocal circuit device is the same as that of the nonreciprocal circuit device shown in the first embodiment.

Figure 8:
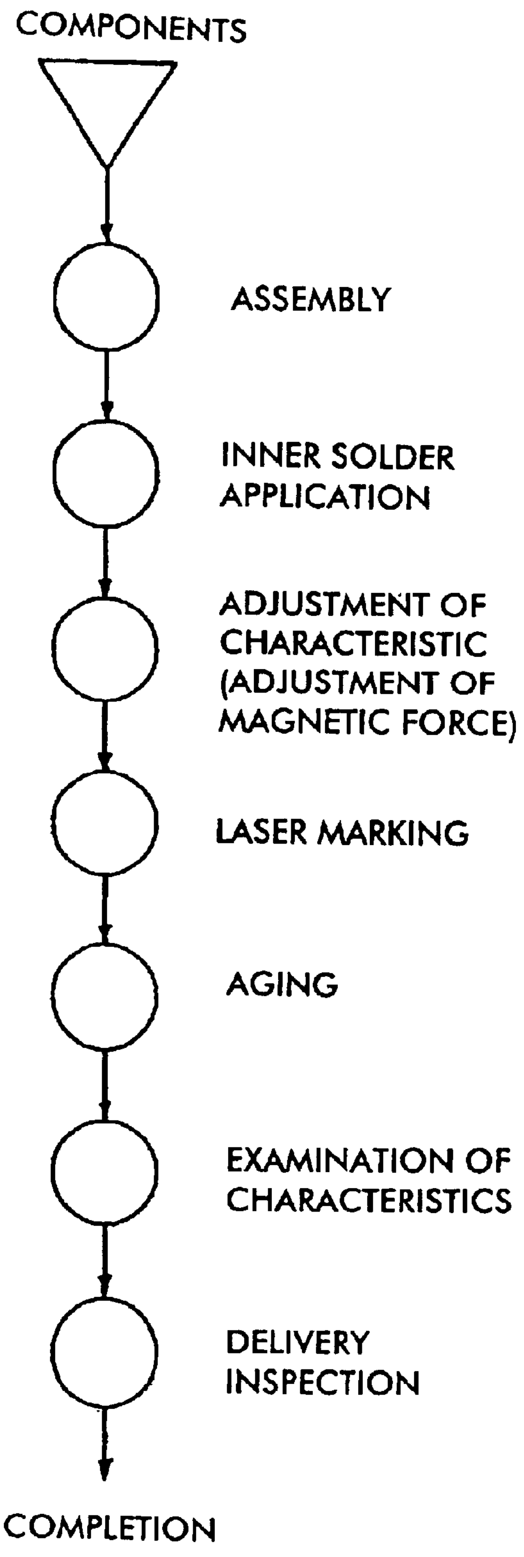
FIG. 8 shows a flowchart for manufacturing a nonreciprocal circuit device according to a second embodiment of the present invention.

In the second embodiment, as shown in FIG. 8, after the components of the device are assembled, in a step of applying inner solder, solder paste is applied to portions to be solder-bonded by using a dispenser or the like.

Next, the magnet is magnetized or demagnetized to make a magnetic-force adjustment (adjustment of characteristic) so that predetermined characteristics can be obtained. Then, product information such as a lot number is marked with a laser beam.

As shown in the first embodiment, in a heating step for thermal aging, thermal demagnetization and the removal of stains left due to laser marking can be carried simultaneously. Furthermore, solder-heating (reflow) can also be performed in this step.

As a solder-reflow condition, while maintaining the melting point of solder between 220° and 240° C. for a given time, the temperature for heating the bonded parts needs to be between 250° and 270° C. at maximum. In order to meet the necessary condition, the surface temperature of the nonreciprocal circuit device needs to be approximately 310° C. at maximum. On the other hand, when the temperature of the nonreciprocal circuit device is over 310° C., deformation of the resin case can occur. Thus, the heating temperature is preferably set to be 310° C. or lower. In contrast, when the heating temperature is lower than 210° C., the solder does not melt and problems occur. For example, impurities remain in the solder paste, which can cause failures in bonding. Thus, the heating temperature is preferably set between 210° and 310° C.

Through the series of steps described above, the process of manufacturing the nonreciprocal circuit device will be completed after characteristic examination and delivery inspection.

Next, referring to FIG. 9, a description will be given of a method of manufacturing the nonreciprocal circuit device according to a third embodiment of the present invention.

Figure 9:
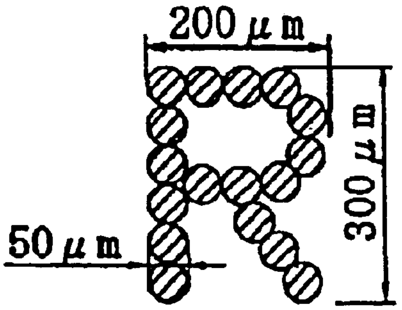
FIG. 9 shows an enlarged view of a character marked on a nonreciprocal circuit device according to a third embodiment of the present invention.

FIG. 9 is an enlarged view of a laser-marked character.

The character printed by laser marking shown in FIG. 9 is formed by irradiating with a pulsed laser beam. The other steps of the process are the same as those performed in the method of manufacturing the nonreciprocal circuit device of the first embodiment.

With the above arrangement, since electric power for irradiation with a laser beam can be reduced, the nonreciprocal circuit device can be manufactured at lower cost.

Next, a nonreciprocal circuit device according to a fourth embodiment of the invention will be described with reference to FIG. 10.

Figure 10:
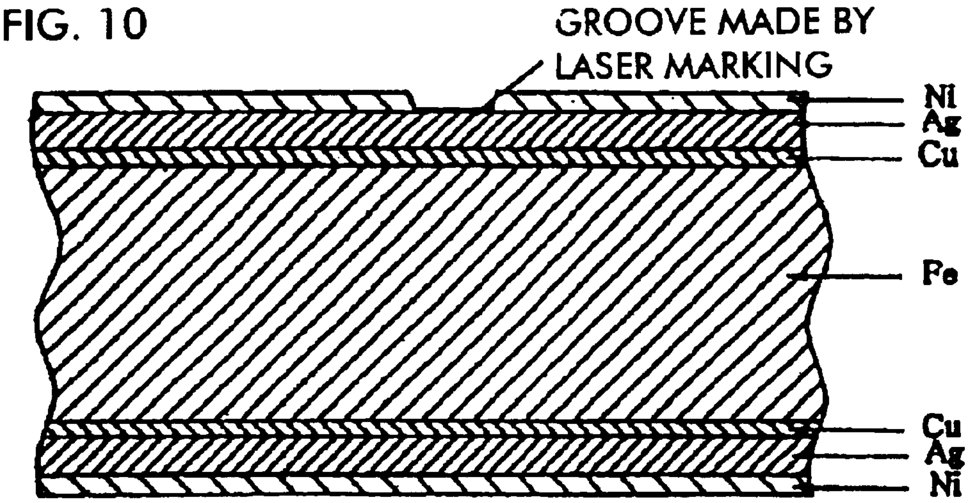
FIG. 10 shows a partial section of a nonreciprocal circuit device according to a fourth embodiment of the present invention.

FIG. 10 is a partial section of an upper yoke as a part of the metal case of the nonreciprocal circuit device.

As shown in FIG. 10, a nickel-plated layer is formed on top of this silver-plated surface. The other arrangements are the same as those shown in the first embodiment.

The thickness of the nickel-plated layer is preferably set between approximately 0.1 and 1.0 $\mu$m.

This is thinner than the skin depth. Consequently, since a ground current flows mainly through the silver-plated layer below the nickel-plated surface layer and conductive loss can be effectively inhibited.

As shown in FIG. 4 of the first embodiment, in the case of a nickel-plated layer, the reflectance of light having a wavelength of approximately 1 $\mu$m is lower than the case of a silver-plated layer. Thus, since the energy of a laser beam can be efficiently absorbed, laser marking can be carried out at a lower power output.

Figure 11:
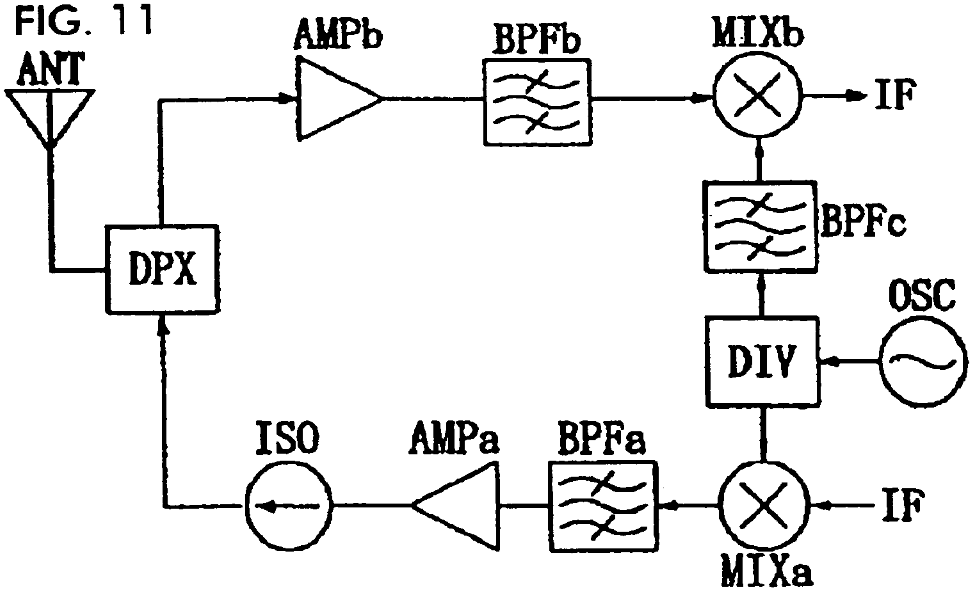
FIG. 11 shows a block diagram of a communication apparatus according to the present invention.
Figure 12:
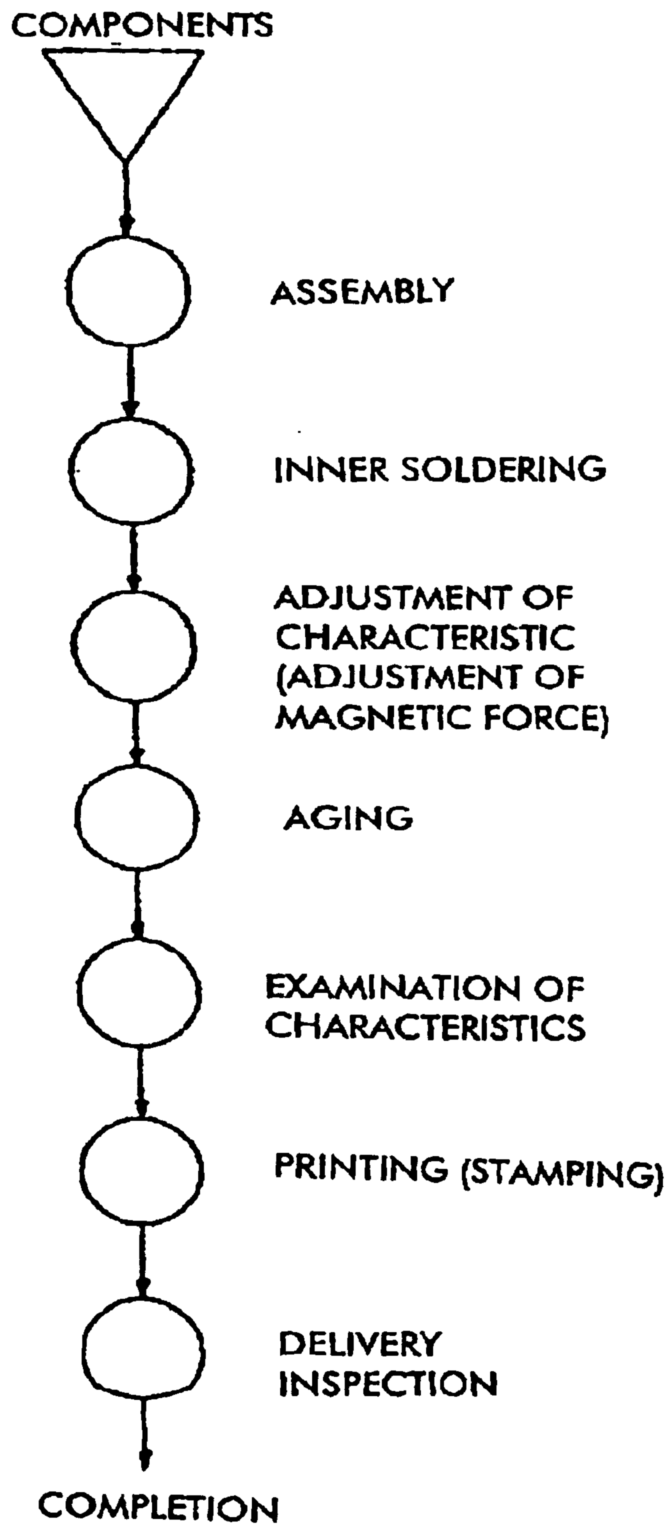
FIG. 12 PRIOR ART
FIG. 12 shows a flowchart for manufacturing a nonreciprocal circuit device according to the related art.
Figure 13A:
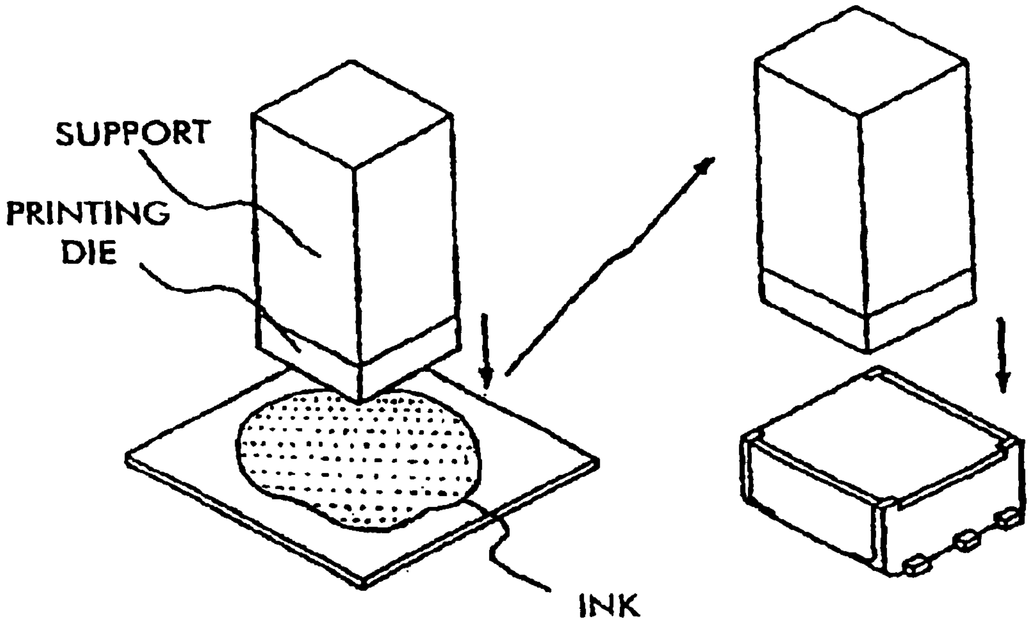
FIG. 13A PRIOR ART
FIGS. 13A to 13C show the concept view of a marking process in the related art, the front view of a printing die, and an enlarged view of a printed character.
Figure 13B:
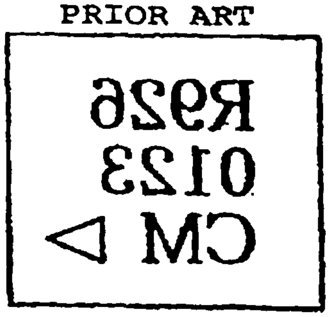
FIG. 13B PRIOR ART
Figure 13C:
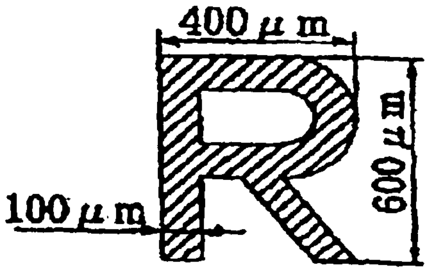
FIG. 13C PRIOR ART

Next, referring to FIG. 11, a description will be given of a communication apparatus according to the invention. In FIG. 11, there are shown a transmission/reception antenna ANT, a duplexer DPX, band pass filters BPFa, BPFb, and BPFc, amplifying circuits AMPa and AMPb, mixers MIXa and MIXb, an oscillator OSC, a divider DIV, and an isolator ISO.

The MIXa mixes an input IF signal with a signal output from the DIV. The BPFa passes only the signals of a transmission frequency band among the signals mixed and output by the MIXa. The AMPa power-amplifies the signals. These signals are transmitted from the ANT via the ISO and the DPX. The ISO blocks signals reflected to the AMPa from the DPX and the like to prevent the deformation of the signals in the AMPa. The AMPb amplifies reception signals sent from the DPX. The BPFb passes only the signals of a reception frequency band among the reception signals output from the AMPb. The MIXb mixes a frequency signal output from the DIV via the BPFc with the reception signal to output an intermediate frequency signal IF.

The isolator ISO shown in FIG. 11 is an isolator shown in each of the first to fourth embodiments.

As described above, according to the present invention, by performing laser marking onto the surface of the metal case of the nonreciprocal circuit device, printing can be made with high precision at low cost without reducing product information even though the size of the nonreciprocal circuit device is miniaturized.

In addition, in the preferred embodiments of the invention, when the nonreciprocal circuit device is heated after the laser marking step, stains left due to the laser marking can be removed. Thus, the problem of black stains can be solved.

In addition, in the magnetic-force adjusting step prior to the heating step, since the permanent magnet is magnetized or demagnetized, the thermal demagnetization can be easily performed in the heating step after the magnetic-force adjusting step.

In addition, in the heating step after the laser marking step, the thermal demagnetization and the removal of stains generated due to the laser marking can be performed. Accordingly, through the fewer steps, both the magnetic-force adjustment by thermal demagnetization and the clear marking of characters can be performed.

In addition, according to the preferred method of the present invention which includes the magnetic-force adjusting step for magnetizing or demagnetizing the magnet prior to the heating step, the heating temperature is preferably set between 110° and 210° C. With this arrangement, a predetermined magnetic force can also be obtained with higher precision and stains left due to laser marking can be removed. Thus, a highly reliable nonreciprocal circuit device can be manufactured.

In addition, prior to the heating step, the method includes the step of solder-bonding the components constituting the nonreciprocal circuit device and the heating temperature in the solder-bonding step is set between 210° and 310° C. As a consequence, a solder-melting step and a step of removing the stains left due to marking while preventing thermal demagnetization due to heating can be performed together. Accordingly, the nonreciprocal circuit device can be easily manufactured at low cost.

In addition, the metal case includes the upper yoke and the lower yoke. Since marking is performed onto the upper yoke with a laser beam, the marking can be performed before assembling the components and therefore the position of the marking step in the manufacturing process can be changed according to the situation.

In addition, when the marking is performed by continuously irradiating a laser beam, clear marking can be achieved even when miniaturizing characters to be marked.

In addition, when marking is performed by irradiating a pulsed laser beam, the electric power required for marking can be reduced. Thus, the nonreciprocal circuit device can be manufactured at low cost.

Additionally, when the wavelength of a laser beam is set to be 10 $\mu$m or less, reflection on the surface of the metal case decreases and therefore laser marking can be performed with high efficiency.

When the laser is a YAG laser or a $YVO_4$ laser, the wavelength of the laser beam is approximately 1.0 $\mu$m. Thus, reflection on the surface of the metal case decreases and therefore laser marking can be performed with high efficiency.

Furthermore, in the preferred embodiment, the coating layer including the silver layer is formed on a surface of the metal case to perform marking onto the coating layer by irradiating a laser beam. As a result, in the nonreciprocal circuit device, the nonreciprocal circuit device can be easily made compact at low cost while maintaining high reliability and reducing loss.

In addition, the coating layer formed of nickel or copper is preferably arranged under the silver layer. This arrangement can increase the adhesion among iron as the base metal, nickel or copper, and silver, as the coating metals. Thus, the nonreciprocal circuit device can have high reliability.

In addition, the entire thickness of the coating layers is preferably set to be 3 $\mu$m or more. As a consequence, the depths of grooves formed by laser marking can be confined within the coating layers, this arrangement can prevent the base metal from becoming rusty and therefore a highly reliable nonreciprocal circuit device can be obtained.

In addition, in this invention, by arranging the coating layer formed of nickel on the surface of the coating layer formed of silver, since the efficiency of laser marking can be enhanced, loss reduction in the device can be achieved.

Furthermore, in this invention, since the communication apparatus incorporates the nonreciprocal circuit device described above, the communication apparatus can be made compact at low cost while maintaining high reliability and reducing loss.

While the invention has particularly shown and described with reference to preferred embodiments thereof, it will be understood by those skilled in the art that the foregoing and other changes in form and details can be made therein without departing from the scope of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of manufacturing a nonreciprocal circuit device, the method comprising the steps of:

providing a metal case covering central conductors, a ferrite core arranged near the central conductors, and a permanent magnet for applying a static magnetic field to the ferrite core;

marking information onto the metal case by irradiating the metal case with a laser beam; and heating the nonreciprocal circuit device after the information has been marked onto the metal case.

2. The method of manufacturing a nonreciprocal circuit device according to claim 1, further comprising magnetizing or demagnetizing the permanent magnet to adjust a magnetic force of the permanent magnet prior to the heating step.

3. The method of manufacturing a nonreciprocal circuit device according to claim 1, wherein the heating step both r moves stains caused by the laser marking and thermally demagnetizes the permanent magnet.

4. The method of manufacturing a nonreciprocal circuit device according to claim 1, wherein the heating temperature in the heating step is set between 110° and 210° C.

5. The method of manufacturing a nonreciprocal circuit device according to claim 1, further comprising applying solder paste to portions where the components comprising the nonreciprocal circuit device are bonded with each other, prior to the heating step.

6. The method of manufacturing a nonreciprocal circuit device according to claim 5, wherein the heating temperature in the heating step is set between 210° and 310° C.

7. The method of manufacturing a nonreciprocal circuit device according to claim 1, wherein the metal case comprises an upper yoke and a lower yoke and the laser marking is performed onto the upper yoke before the upper and lower yokes are bonded with each other.

8. The method of manufacturing a nonreciprocal circuit device according to claim 1, wherein the laser marking is performed by continuously irradiating a laser beam onto the metal case.

9. The method of manufacturing a nonreciprocal circuit device according to claim 1, wherein the laser marking is performed by irradiating the metal case with a pulsed laser beam.

10. The method of manufacturing a nonreciprocal circuit device according to claim 1, wherein the laser beam has a wavelength of 10 $\mu$m or less.

11. The method of manufacturing a nonreciprocal circuit device according to claim 1, wherein the used laser is a YAG laser or a $YVO_4$ laser.

* * * * *